United States Patent [19]
Dukes

[11] Patent Number: 5,132,990
[45] Date of Patent: Jul. 21, 1992

[54] HIGH SPEED DATA SYNCHRONIZER

[75] Inventor: Glenn E. Dukes, Colorado Springs, Colo.

[73] Assignee: NCR Corporation, Dayton, Ohio

[21] Appl. No.: 608,854

[22] Filed: Nov. 5, 1990

[51] Int. Cl.$^5$ ............................................. H04L 7/08
[52] U.S. Cl. ......................................... 375/111; 307/523
[58] Field of Search ................. 370/105.3; 375/4, 106, 375/111; 307/516, 518, 523, 527, 353; 328/151

[56] References Cited

U.S. PATENT DOCUMENTS

| | | | |
|---|---|---|---|
| 4,362,957 | 12/1982 | Stern | 307/527 |
| 4,422,176 | 12/1983 | Summers | 375/120 |
| 4,446,389 | 5/1984 | Williams et al. | 307/515 |
| 4,471,235 | 9/1984 | Sakhuja et al. | 307/234 |
| 4,527,080 | 7/1985 | Zweig | 307/510 |
| 4,529,892 | 7/1985 | Reilly et al. | 307/361 |
| 4,549,094 | 10/1985 | Floyd | 307/247 |
| 4,965,814 | 10/1990 | Yoshida et al. | 375/111 |

Primary Examiner—Benedict V. Safourek
Attorney, Agent, or Firm—Jack R. Penrod

[57] ABSTRACT

A synchronizer which samples and stores the synchronized data with a transparent latch instead of a flip-flop or similar device to avoid the long set-up times required by such devices. The synchronizer compares its input level to its output level. When they are found to be different because of an input data change, the difference is used to gate the system clock, which in turn gates the transparent latch to sample and store the changed input data level as the new data output level. Since the change in the input data gates the system clock which further gates the opening of the latch, the input data is essentially guaranteed to fulfill the latch set up time requirements. For the difficult case when the input data change occurs as the clock is changing states, a Schmitt trigger is inserted ahead of the latch gating input. The Schmitt trigger will either respond and provide a proper pulse width and magnitude to drive the latch without metastability, or it will pass a "runt pulse" and not respond to it. The latch gating input likewise will not respond to the "runt pulse" because of the pulse's insufficient duration or level. Thus, the Schmitt trigger acts as a matched filter to prevent metastability problems from any runt pulses.

11 Claims, 3 Drawing Sheets

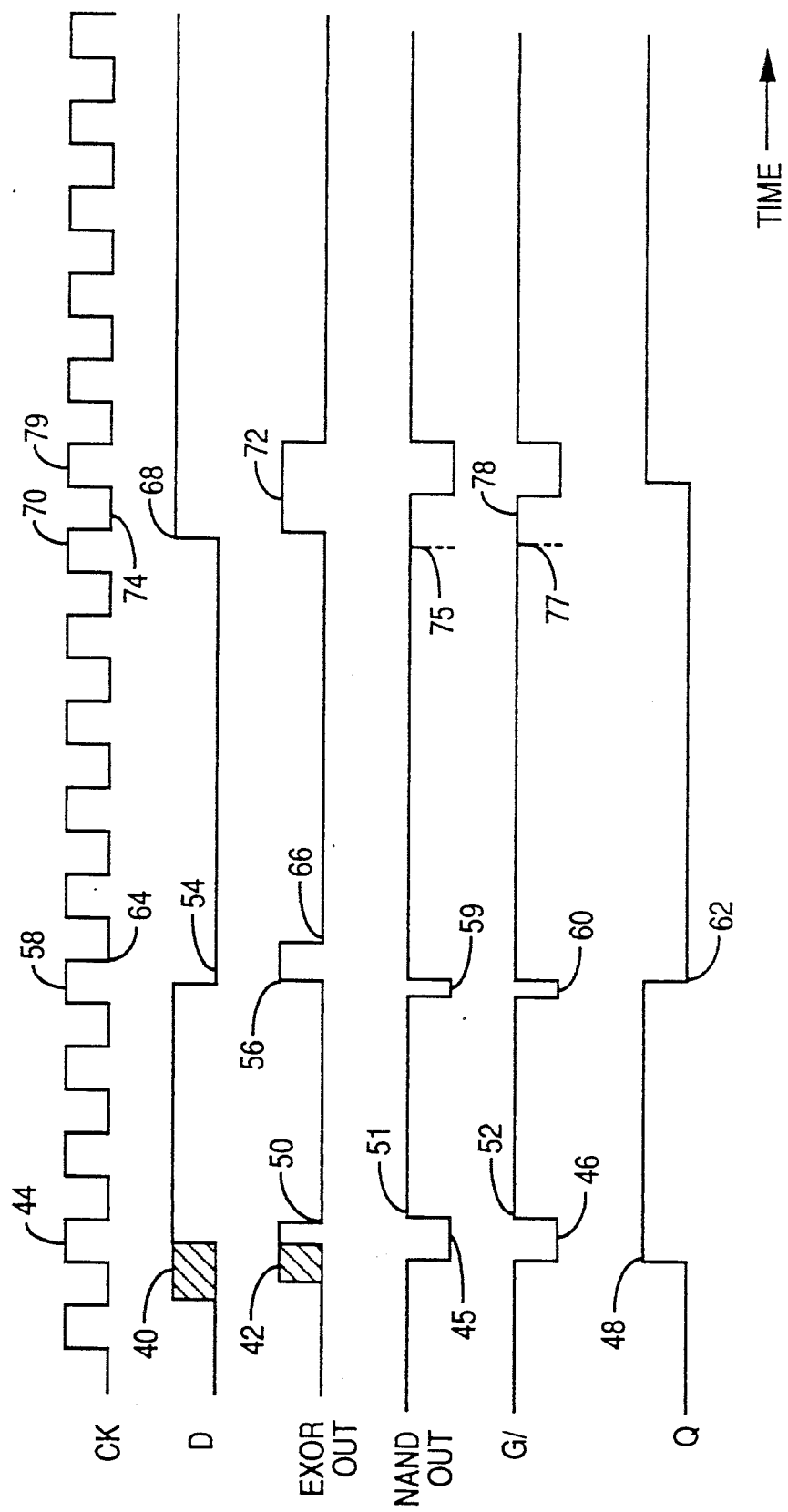

HIGH SPEED DATA SYNCHRONIZER

BACKGROUND OF THE INVENTION

The present invention relates to an electronic digital circuit, and more particularly to a circuit for synchronizing asynchronous high speed data to a system clock in order to use the high speed data in an electronic data processing system.

High speed electronic data processing systems often are required to receive and assimilate high speed data signals that are asynchronous with respect to the internal clock of the system. For example, data signals received via a proposed IEEE X3T9.2 (SCSI II) bus or an FDDI bus. A known data synchronizer uses a type of AND gate to sample the asynchronous data signals at a data input with an edge (either leading or trailing) of the system clock pulse. Each sample is, therefore, the binary product of the asynchronous input signal level and the clock edge level. Additionally, each binary product is subsequently stored in a flip-flop until it is synchronously read by the remainder of the receiving system.

A common problem in this known type of data synchronizer is the occurrence of metastable oscillations. Metastable oscillations occur in cross coupled feedback devices, such as flip-flops, when the set up times of their inputs have not been observed. The set-up time requirement is essentially the time required for the two inputs of a cross coupled feedback device to switch to a stable binary condition. Unfortunately with asynchronous inputs, proper set-up times cannot be assured.

One solution to this problem is to precede the cross coupled device with a sampling gate such as an AND gate or a NAND gate. The asynchronous data signal is inputted on one of the AND/NAND inputs and a second input is driven by the sampling clock. The AND/NAND gate pre conditions the asynchronous signal to the system clock and removes some of the metastability problem. However, there is still a metastability problem when the asynchronous input signal is changing binary states at the same time that the system clock is sampling the asynchronous input signal. In such a case, the resulting product of the AND/NAND gate may be a signal having an intermediate level that is too high to be considered a binary LO state, and too low to be considered a binary HI state. Such an intermediate signal level may be considered by binary devices as either a HI state or a LO state. On the other hand, the resulting output of the AND/NAND pre-conditioner may be a signal that is too brief in duration to provide sufficient time for the input gates of the cross coupled device to reliably switch to a stable condition that would be logically required by the input pulse if it had sufficient duration. Thus, the known synchronizer with an AND/NAND pre-conditioner is less prone to metastability problems, but they still occur.

Thus, there is a need in the art for a synchronizer which overcomes metastability problems. Such a synchronizer would use a method of synchronizing an asynchronous input that would be applicable to all logic families and fabrication processes as long as the characteristics of each logic family and fabrication process were observed.

It is an object of the present invention to provide a data synchronizer that is free from metastable oscillations.

It is another object of the invention to provide a data synchronizer that operates at a high clock frequencies and high asynchronous data rates without metastability problems.

SUMMARY OF THE INVENTION

According to one aspect of the invention, the foregoing objects are achieved by providing a synchronizer for synchronizing an input data signal with a clock signal. The synchronizer includes a transparent latch having a data input connected to the input data signal, a gating input, and a non-inverted output; an Exclusive-OR gate having a first input connected to the data input of the transparent latch, a second input connected to the non-inverted output of the transparent latch, and an output; a device for forming a boolean product having a first input connected to the Exclusive-OR gate output, a second input to the system clock signal, and an inverted output; and a trigger device for amplifying and lengthening a pulse having an input connected to the inverted output and an output connected to the transparent latch gating input. The synchronizer output at the non-inverted output of the latch is the asynchronous input data signal that has been synchronized to the clock signal.

In accordance with another aspect of the invention, the aforementioned objects are achieved by providing a method for synchronizing an input data signal with a clock signal. The method includes the steps of comparing the input data signal to an output signal of a sample and hold device; gating a portion of the system clock signal to a matched filter device if the input data signal and the output signal of the sample and hold device are not equal, otherwise disabling any portion of the system clock signal to the matched filter device; match filtering the transferred portion of the system clock signal to provide output signal of sufficient level and duration to be a logic HI or a logic LO within its respective logic family; enabling the sample and hold device to sample the input data signal as the output signal thereof; and holding the output signal value if the input data signal and the output signal are equal or if the gated portion of the system clock is active. The held output signal value is a data signal that has been synchronized to the system clock and has the same information content as the asynchronous input data signal.

BRIEF DESCRIPTION OF THE DRAWINGS

While the specification concludes with the appended claims particularly pointing out and distinctly claiming the subject matter which is regarded as the invention, it is believed that the invention will be better understood from the following detailed description of the illustrative embodiments taken in conjunction with the accompanying drawings wherein like reference numbers indicate like parts, and in which:

FIG. 3 shows various voltage versus time graphs that are useful for understanding the invention.

DETAILED DESCRIPTION OF A PREFERRED EMBODIMENT

Figure 1:
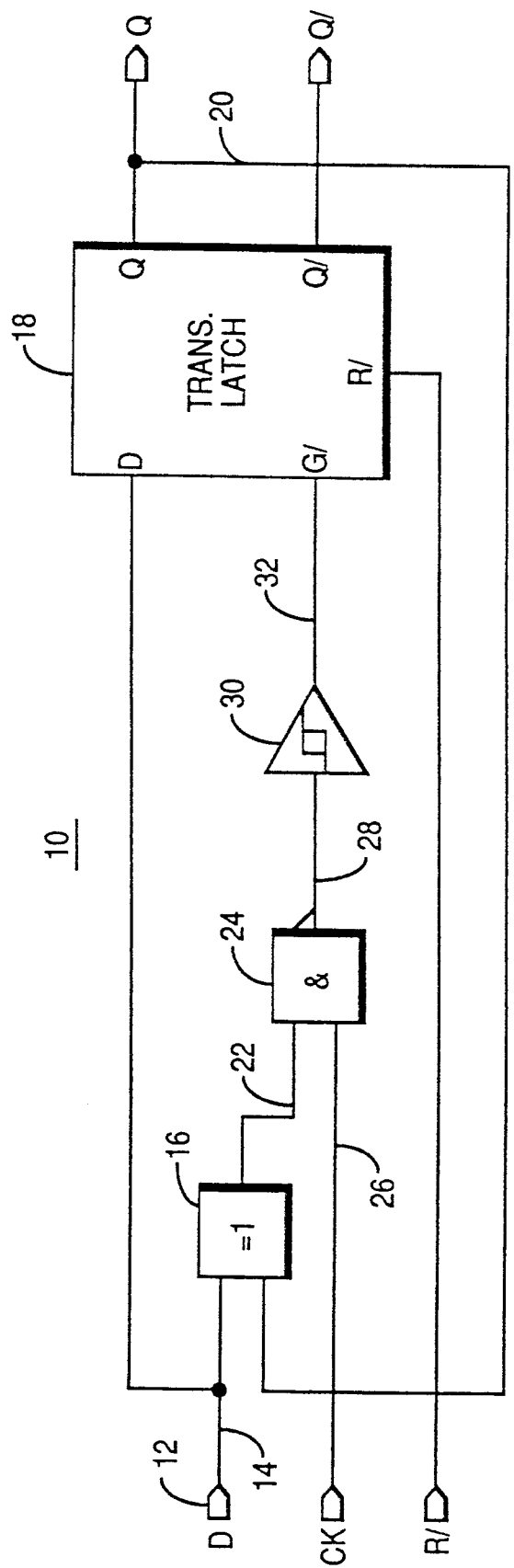
FIG. 1 is a block diagram of one embodiment of a data synchronizer according to the present invention.

Referring to FIG. 1, there is shown a block diagram of a data synchronizer 10 in accordance with the present invention. The data synchronizer 10 receives asynchronous data on terminal 12. Terminal 12 is connected via conductor 14 to one input of Exclusive OR gate 16, and also to a data input D of a transparent latch 18. The transparent latch 18 has a non-inverted output Q, which is connected back to a second input of the Exclusive OR 16 via conductor 20.

The Exclusive OR 16 has an output which is connected via conductor 22 to one input of a NAND gate 24. A system clock signal (CK) is connected via conductor 26 to a second input of the NAND gate 24. The output of the NAND gate 24 is connected via conductor 28 to a Schmitt trigger gate 30. The Schmitt trigger gate 30 preferably has a one volt hysteresis between 2.2 volts and 3.2 volts where the Schmitt trigger gate 30 will not change states as long as its input is greater than 2.2 volts but less than 3.2 volts. However, other thresholds are known and modifications may be made to these threshold voltages without departing from the scope of the present invention.

An output of the Schmitt trigger gate 30 is connected via a conductor 32 to a gating input G/ of the transparent latch 18. The gating input G/ is an active LO input, which means that the transparent latch is active or open when the signal on input G/ is a logic LO.

The transparent latch 18 also has a reset input R/ which is an active LO input. The reset input R/ may be used if it is desirable to initialize the synchronizer 10 to the logic LO state during power-up or similar conditions.

Figure 2:
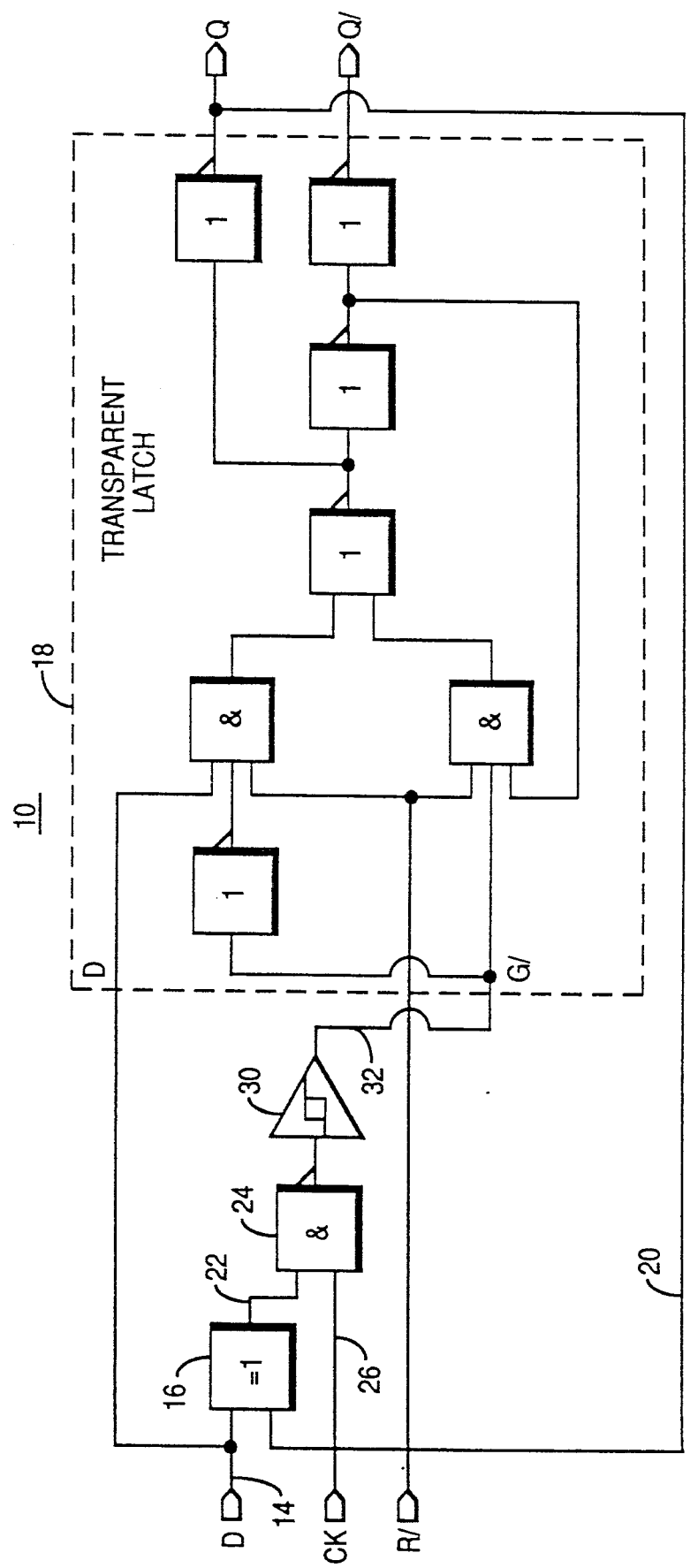
FIG. 2 is a block diagram of the data synchronizer according to FIG. 1, showing further details thereof.

Referring now to FIG. 2, the synchronizer 10 will be described in further details. The logic functions are all logic cells from the NCR VS1500 Standard Cell Library, although other equivalent cells from other cell libraries could be used with some variations in performance. The NCR VS1500 Standard Cell Library is disclosed in NCR ASIC DATA BOOK 1989, published by NCR Corporation, Dayton, Ohio, and this book is hereby incorporated by reference.

One embodiment of the synchronizer 10 has an EXORH cell as the Exclusive OR gate 16, a NAN2H cell as the NAND gate 24, a DS2232 cell as the Schmitt trigger gate 30, and an LATRPF (i.e. a fast transparent latch) as the transparent latch 18. The logic diagram of the LATRPF is shown in FIG. 2 to emphasize the fact that the transparent latch 18 is not a cross coupled device. This is important because cross coupled devices, such as flip-flops are prone to metastable oscillations if their set-up times are not met by the incoming asynchronous data. The transparent latch 18 is not subject to metastable oscillations because it is not a cross coupled device.

As a class, transparent latches are not subject to metastable oscillations. However, transparent latches, such as latch 18, may exhibit non-oscillatory metastable output voltage fluctuations if their data input set-up and gating input requirements are violated. The usual metastable result when either the data input set-up requirement or the gating input requirement is not met is an increase in the time for the output voltage of the latch to settle to predetermined binary voltage level, such as a logic HI or a logic LO.

The embodiment of the synchronizer 10 shown in FIG. 2 recognizes and overcomes the metastability problems of transparent latches. The asynchronous data on input terminal 12 is used in part to condition the clock signal (CK) through NAND gate 24. Thus, the logically conditioned clock signal is gated to the Schmitt trigger 30 and to the gating input G/ of the latch 18. Because of the gating involved, this conditioned clock signal is always more than one propagation delay behind the asynchronous data on the data input D of the latch 18 and thereby always fulfills the set up time requirement of the gating input G/.

The more difficult case, as described in the Backround of the Invention, occurs when the asynchronous data is transitioning near an edge of the clock signal (CK). In such a case the output of the NAND gate 24, as will be explained in greater detail in connection with FIG. 3, may be a runt pulse that is of a short duration or of indeterminate voltage level.

The Schmitt trigger 30 under runt pulse input conditions has a non-hysteresis response which outputs the runt pulse with essentially the same magnitude and pulse width as the input runt pulse. The transparent latch 18 has similar gating input response characteristic, because the gating input components simply do not logically respond to the runt pulse. Within limits, the non-hysteresis response of the Schmitt trigger 30 can be varied by changing its the active and passive components in order to match the runt pulse response of the gating input of the latch 18. Further, by matching the runt pulse response range of the Schmitt trigger 30 with the runt pulse response of the gating input G/, the combination of the Schmitt trigger 30 and the latch 18 will either jointly ignore a given pulse as a runt pulse, or the Schmitt trigger 30 will logically respond to the pulse and its gain and hysteresis characteristic response will provide a robust logic output pulse to the gating input G/ of the latch 18. Thus, by varying the response characteristics of the Schmitt trigger 30, it can act as a matched filter and filter out the runt pulses which would otherwise cause metastability problems to the latch 18.

The matched filter filtering of the signal to the gating input G/ of the latch 18, along with the delay of the signal by the pre-conditioning gates mentioned previously, allow the synchronizer 10 to operate without metastability problems throughout its entire operating range of clock and data frequencies.

Referring now to FIGS. 1 and 3, a synchronization of an asynchronous input data signal D will be described. All synchronizers, including sysnchronizer 10, must meet the condition for anti-aliasing sampling which is known as the Nyquist critereon. The critereon states that the system clock rate must be at least twice as the input data rate in order to prevent ambiguities with other frequencies (i.e., aliasing). Thus for system clock rates in the 25-60 MHZ range for CMOS technology, input data rates of 12.5 to 30 Mbits/sec per input are possible without aliasing.

The initial state of the synchronizer 10 shown in FIG. 3 has the non-inverted output Q at logic LO 36, and the input data signal on input D at logic LO 38. Some time after this initial condition, the input data transitions from a logic LO to a logic HI. The cross hatching on the rising edge of the input data means that the synchronizer "doesn't care" when the logic transition occurs within the cross hatched region 40. It can be anytime while the clock signal is at logic LO, or it can be after the leading edge of the clock signal has transitioned to logic HI. When the input data on input D transitions to a logic HI, the non-inverted output Q has not yet been enabled to follow, resulting in an difference in logic level between the input data on conductor 14 to the Exclusive OR gate 16 and the fedback non-inverted output logic level on conductor 20. This difference in input logic levels causes the output of the Exclusive OR gate 16 to transition to a logic HI. The transition is shown as a cross hatched region 42 because it follows the transition of the input data on conductor 14.

The logic HI output of Exclusive OR gate 16 outputs a logic HI on one input of the NAND gate 24, which enables this gate. The other input of the NAND gate 24 is driven by the system clock signal. Thus, when the system clock goes to logic HI at point 44, the output of the NAND gate 24 goes to a logic LO 45. The output of the NAND 24 is a robust gated clock pulse which readily propagates through the Schmitt trigger gate 30 with minimal delay and drives the gate input G/ of the latch 18 with a logic LO 46. Since, as mentioned previously, this gating input G/ is an active LO input, then the latch 18 is activated or 'opened' by this logic LO 46. When the latch 18 is 'opened', its non-inverted output Q goes to the same logic level as its D input, in this case a logic HI 48. Thus, before one full clock period has elapsed, the output of the synchronizer 10 has been synchronized to within a few propagation delays of a positive going clock signal 44.

Once the input and the output of the synchronizer 10 are at equal logic levels, then the output of the Exclusive OR 16 goes back to a logic LO 50, which disables the NAND gate 24 and the Schmitt trigger 30 from transmitting a portion of the clock signal therethrough. The outputs of the NAND gate 24 and the Schmitt trigger 30 respectively transition to logic HIs 51 and 52. Admittedly the transmitted portion of the clock signal is inverted by the NAND gate 24, but that is only because the gating input is an active LO input, an AND gate might be substituted if the latch had an active HI gating input instead. The logic HI 52 on the latch gating input G/ 'closes' the latch 18 which will hold this output level until the gating input G/ goes active again.

The synchronizer 10 will remain unchanged until the input data signal to input D goes to a logic LO 54. As before, the logic LO 54 is different from the the logic HI 48 on the non-inverted output Q of the latch 18. This difference induces the Exclusive OR gate 16 to transition from the logic LO 50 to a logic HI 56. The logic HI 56 enables a portion of a logic HI 58 of the clock signal to propagate (in the inverted mode) through the NAND gate 24 as a logic LO 59. The output signal is of NAND gate 24 is robust enough to propagate through Schmitt trigger 30 as a logic LO 60. This logic LO 60 'opens' the latch 18 for its logic level to change to the new logic LO 54 presently driving its D input. It is worth noting that since the transition of the D input to the logic level LO 54 started all of this switching, and because the latch 18 is not 'opened' for at least two propagation delays after the D input goes to the logic LO 54, the synchronizer 10 is guaranteed that the set up time of the latch 18 is fulfilled. The latch 18 quickly responds to its inputs and resets its output to a logic LO 62 before a transition of the clock signal to a logic LO 64 'closes' the latch 18. Thus, the trailing edge of a data signal is synchronized to within one half cycle of a falling edge of the system clock signal.

As mentioned above, the synchronizer 10 will remain with its output at the logic LO 62 until the input data on the D input of the latch 18 goes to a logic HI 68. The transition from the logic LO 54 to the logic HI 68 is the type of transition that may cause problems for some synchronizers. The transition to the logic HI 68 occurs late in the clock period while the clock is active, that is a logic HI 70. The logic HI 68 on the D input of the synchronizer 10 and the logic LO 62 on its output Q, causes the Exclusive OR 16 to switch to a logic HI 72. The logic HI 72 enables the NAND gate 24 to transmit (in inverted mode) a portion of the logic HI 70 clock signal. However, only a small portion of the logic HI 70 is transmitted through the NAND gate 24 before the clock signal transitions to logic LO 74. With this combination of inputs, the NAND gate 24 will either output a very brief indeterminate voltage pulse 75 or a very brief logic LO 76. For either the indeterminate pulse 75 or the very brief logic LO 76, the pulse duration is too short for the Schmitt trigger 30 to provide a hysteresis response and the pulse 75 or 76 will be conducted through to the output of the Schmitt trigger 30 and appear as the pulse 77 on the gating input G/ to the latch 18. But, the NAND gate 24 and the Schmitt trigger 30 characteristics are tailored and matched to those of the components of the gating input G/ of the latch 18. Thus, the runt pulses 75 and/or 76 are matched filtered and ignored by the Schmitt trigger 30 and the latch 18, and thereby metastability problems are avoided.

When driven with proper logic levels, the logic HI 68 will be synchronized to the next positive transition of the clock signal to logic HI 79. At the time of the transition to logic HI 79, the logic conditions look essentially the same as the logic conditions at the time of the transition to logic HI 44, and the synchronizer 10 responds just as it did in the initial case of the asynchronous data input 40. Thus, the synchronizer 10 successfully synchronizes input data to the system clock under all types of asynchronous conditions.

Although a high frequency CMOS embodiment of the high speed synchronizer has been described, those skilled in the art will appreciate that other embodiments of the invention could readily be made using other fabrication processes such as NMOS, LSTTL, TTL, ECL, etc., or other cell libraries, and such modifications are deemed to be within the scope of the present invention.

Thus, it will now be understood that there has been disclosed a high speed data synchronizer and the method by which it operates to synchronize asynchronous data at high clock and data rates by matching the non-binary response region of the Schmitt trigger to the non-response region of the transparent latch and thereby avoids metastability problems. While the invention has been particularly illustrated and described with reference to a preferred embodiment thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. A synchronizer for synchronizing an input data signal with a system clock signal, comprising:
   a transparent latch having a data input, a gating input, and a non-inverted output;
   said data input is connected to the input data signal;
   an Exclusive-OR gate having a first input connected to said data input of said transparent latch, a second input connected to said non-inverted output of said transparent latch, and an output;
   means for forming a boolean product having a first input connected to said Exclusive-OR gate output, a second input to said system clock signal, and an inverted output; and trigger means for shaping and lengthening pulses, said trigger means having an input connected to said inverted output and an output connected to said transparent latch gating input;

said transparent latch in response to said output from said trigger means and said input data signal provides a data output signal that has the data content of the input data signal and is synchronized to the system clock signal.

2. The synchronizer of claim 1, wherein said means for forming a boolean product is a positive logic NAND gate.

3. The synchronizer of claim 2, wherein said trigger means is a Schmitt trigger gate.

4. The synchronizer of claim 3, wherein said Schmitt trigger gate is matched to characteristics of said transparent latch gating input such that said Schmitt trigger gate linearly transfers but otherwise does not shape and lengthen a runt pulse that would cause said transparent latch to have metastable voltage fluctuations at its output.

5. The synchronizer of claim 4, wherein said Schmitt trigger gate has a voltage switching hysteresis characteristic such that the trigger voltage threshold is at least one volt greater than the retrigger voltage threshold.

6. A synchronizer apparatus for synchronizing an asynchronous data signal with a system clock signal, comprising:

a transparent latch having a data input, a gating input, and a non-inverted output;

an Exclusive-OR gate having a first input connected to said data input of said transparent latch and an output;

means for forming a boolean product having a first input connected to said Exclusive-OR gate output, a second input to said system clock signal, and an inverted output;

trigger means for shaping and lengthening pulses, said trigger means having an input connected to said inverted output and an output connected to said transparent latch gating input; and a conductor connecting said non-inverted output of said transparent latch to said first input of said Exclusive-OR gate to feedback an output signal from said output of said transparent latch to a second input of said Exclusive-OR gate;

whereby a data signal that is inputted on said data input is converted to an output signal that is synchronized to the system clock signal and is outputted on said non-inverted output of said transparent latch.

7. The synchronizer of claim 6, wherein said means for forming a boolean product is a positive logic NAND gate.

8. The synchronizer of claim 7, wherein said trigger means is a Schmitt trigger gate.

9. The synchronizer of claim 8, wherein said Schmitt trigger gate is matched to characteristics of said transparent latch gating input such that said Schmitt trigger gate linearly transfers but otherwise does not shape and lengthen a runt pulse that would cause said transparent latch to have metastable voltage fluctuations at its output.

10. The synchronizer of claim 9, wherein said Schmitt trigger gate has a voltage switching hysteresis characteristic such that the trigger voltage threshold is at least one volt greater than the retrigger voltage threshold.

11. A method of synchronizing an input data signal with a system clock signal, comprising the steps of:

comparing the input data signal to an output signal of a sample and hold device;

gating a portion of the system clock signal to a matched filter device if the input data signal and the output signal of the sample and hold device are not equal, otherwise disabling any portion of the system clock signal;

match filtering the transferred portion of the system clock signal to provide output signal of sufficient level and duration to be a logic HI or a logic LO within its respective logic family;

enabling the sample and hold device to sample the input data signal as the output signal thereof; and holding the output signal value if the input data signal and the output signal are equal or if the gated portion of the system clock is active.

* * * * *